(12) United States Patent
Griffin et al.

(10) Patent No.: US 11,580,849 B2
(45) Date of Patent: Feb. 14, 2023

(54) WEARABLE ELECTRONIC SYSTEMS HAVING VARIABLE INTERACTIONS BASED ON DEVICE ORIENTATION

(71) Applicant: GOOGLE LLC, Mountain View, CA (US)

(72) Inventors: Jason T. Griffin, Kitchener (CA); Steven Henry Fyke, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 226 days.

(21) Appl. No.: 16/596,035

(22) Filed: Oct. 8, 2019

(65) Prior Publication Data

US 2020/0118420 A1 Apr. 16, 2020

Related U.S. Application Data

(60) Provisional application No. 62/744,282, filed on Oct. 11, 2018.

(51) Int. Cl.
*G06F 3/01* (2006.01)
*G08C 17/02* (2006.01)
*G06F 3/038* (2013.01)
*G06F 3/0487* (2013.01)

(52) U.S. Cl.
CPC ............. *G08C 17/02* (2013.01); *G06F 3/038* (2013.01); *G06F 3/0487* (2013.01); *G06F 2203/0331* (2013.01); *G08C 2201/32* (2013.01)

(58) Field of Classification Search
None
See application file for complete search history.

(56) References Cited

U.S. PATENT DOCUMENTS

| | | | |
|---|---|---|---|
| 2016/0179210 A1* | 6/2016 | Sakai | G06F 3/017 345/156 |
| 2018/0239429 A1* | 8/2018 | Gupta | G06F 3/03547 |
| 2019/0041999 A1* | 2/2019 | Hirata | G06F 3/014 |

* cited by examiner

*Primary Examiner* — Joseph R Haley

(57) ABSTRACT

Wearable electronic systems having varying interactions based on device orientations are described herein. The systems include a first wearable electronic device and a second wearable electronic device having an input device and a device orientation sensor. The device orientation sensor detects a device orientation of the second wearable electronic device and generates a device orientation signal. The systems have a first mapping orientation mode that performs a first mapping between inputs from the input device and functions of a user interface displayed on the first wearable electronic device when the second wearable electronic device has a first device orientation and a second mapping orientation mode that performs a second mapping between inputs from the input device and functions of the user interface displayed on the first wearable electronic device when the device orientation of the second wearable electronic device detected by the device orientation sensor is a second device orientation.

20 Claims, 5 Drawing Sheets

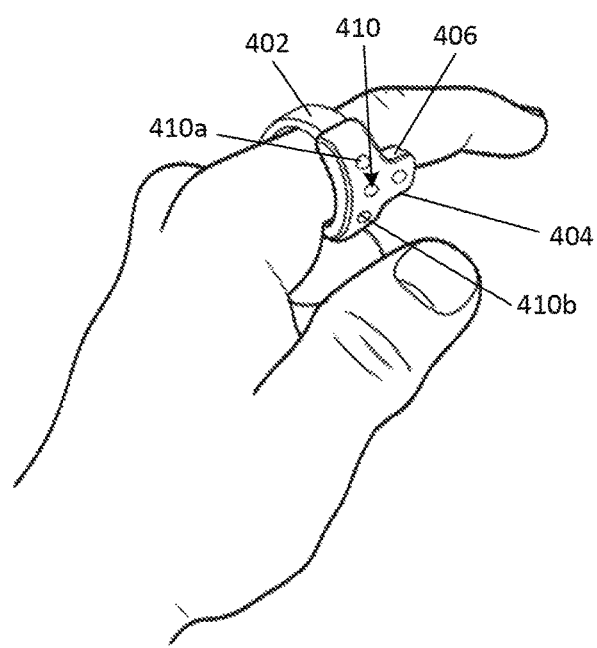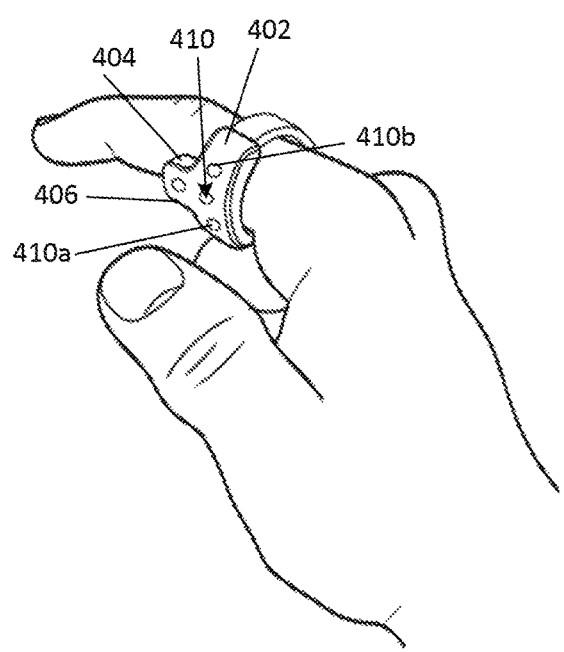
FIG. 4A                    FIG. 4B

WEARABLE ELECTRONIC SYSTEMS HAVING VARIABLE INTERACTIONS BASED ON DEVICE ORIENTATION

TECHNICAL FIELD

The present systems, devices, and methods generally relate to wearable electronic devices and particularly relate to wearable electronic systems having multiple wearable electronic devices with variable interactions therebetween based on device orientation.

BACKGROUND

Description of the Related Art

WEARABLE ELECTRONIC DEVICES

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be "wireless" (i.e., designed to operate without any wire-connections to other, non-portable electronic systems); however, a small and lightweight electronic device may still be considered portable even if it includes a wire-connection to a non-portable electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Because they are worn on the body of the user, visible to others, and generally present for long periods of time, form factor (i.e., size, geometry, and appearance) is a major design consideration in wearable electronic devices.

WEARABLE HEADS-UP DISPLAYS

A head-mounted display is an electronic device that is worn on a user's head and, when so worn, secures at least one electronic display within a viewable field of at least one of the user's eyes. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Microsoft Hololens® just to name a few.

BRIEF SUMMARY

The various embodiments described herein generally relate to wearable electronic devices having user interface mirroring.

A wearable electronic system may be summarized as including a first wearable electronic device having a first processor, a first non-transitory processor-readable storage medium communicatively coupled to the first processor, a display communicatively coupled to the first processor, and a first communication interface communicatively coupled to the first processor, and a second wearable electronic device having a device orientation sensor, a second communication interface communicatively coupled to the device orientation sensor, and an input device communicatively coupled to the second communication interface, the device orientation sensor to detect a device orientation of the second wearable electronic device and generate a device orientation signal in response to detecting the device orientation of the second wearable electronic device, the input device to receive an input from a user of the second wearable electronic device and generate an input signal in response to receiving the input from the user, and the second communication interface to transmit signals. The first communication interface is communicatively coupleable with the second communication interface to provide communications between the first wearable electronic device and the second wearable electronic device. The first non-transitory processor-readable storage medium of the first wearable electronic device stores processor-executable instructions that, when executed by the first processor, cause the first wearable electronic device to generate and display a user interface on the display of the first wearable electronic device. The wearable electronic system has a first mapping orientation mode that performs a first mapping between inputs from the user detected by the input device of the second wearable electronic device and functions of the user interface displayed on the display of the first wearable electronic device when the device orientation of the second wearable electronic device detected by the device orientation sensor is a first device orientation, and a second mapping orientation mode that performs a second mapping between inputs from the user detected by the input device of the second wearable electronic device and functions of the user interface displayed on the display of the first wearable electronic device when the device orientation of the second wearable electronic device detected by the device orientation sensor is a second device orientation.

In the wearable electronic system, the second communication interface of the second wearable electronic device may transmit the device orientation signal and the input signal, and the processor-executable instructions stored in the first non-transitory processor-readable storage medium of the first wearable electronic device that, when executed by the first processor, cause the first wearable electronic device to generate and display a user interface on the display of the first wearable electronic device, may further cause the first processor to effect: the first mapping orientation mode in response to receiving a first device orientation signal from the second wearable electronic device indicative of the second wearable electronic device having the first device orientation; or the second mapping orientation mode in response to receiving a second device orientation signal from the second wearable electronic device indicative of the second wearable electronic device having the second device orientation.

In the wearable electronic system, in the first mapping orientation mode, the processor-executable instructions stored in the first non-transitory processor-readable storage medium of the first wearable electronic device that, when executed by the first processor, cause the first wearable electronic device to generate and display a user interface on the display of the first wearable electronic device, may cause the first processor to effect a first function of the user interface displayed on the display of the first wearable electronic device in response to receiving the input signal via the first communication interface, and, in the second mapping orientation mode, the processor-executable instructions stored in the first non-transitory processor-readable storage medium of the first wearable electronic device that, when executed by the first processor, cause the first wearable electronic device to generate and display a user interface on the display of the first wearable electronic device, may cause the first processor to effect a second function of the user interface displayed on the display of the first wearable electronic device in response to receiving the input signal via the first communication interface.

In the wearable electronic system, in the first mapping orientation mode the first processor may map a first user input received from the second wearable electronic device to a first function of the user interface displayed on the display of the first wearable electronic device, and in the second mapping orientation mode the first processor may map the first user input received from the second wearable electronic device to a second function of the user interface displayed on the display of the first wearable electronic device.

In the wearable electronic system, in the second mapping orientation mode, the first processor may map a second user input received from the second wearable electronic device to the first function of the user interface displayed on the display of the first wearable electronic device.

In the wearable electronic system, the second wearable electronic device may further comprise a second processor and a second non-transitory processor-readable storage medium communicatively coupled to the second processor, the second non-transitory processor-readable storage medium storing processor executable instructions that, when executed by the second processor, cause the second wearable electronic device to: process the device orientation signal and the input signal to produce an oriented input signal; and transmit the oriented input signal via the second communication interface.

In the wearable electronic system, processor-executable instructions stored in the second non-transitory processor-readable storage medium that, when executed by the second processor, cause the second processor to process the device orientation signal and the input signal to produce an oriented input signal, may cause the second processor to effect: the first mapping orientation mode in response to receiving a first device orientation signal from the device orientation sensor indicative of the second wearable electronic device having the first device orientation, wherein in the first mapping orientation mode the processor-executable instructions stored in the second non-transitory processor-readable storage medium that, when executed by the second processor, cause the second processor to transmit the oriented input signal via the second communication interface, cause the second processor to transmit a first oriented input signal via the second communication interface; or the second mapping orientation mode in response to receiving a second device orientation signal from the device orientation sensor indicative of the second wearable electronic device having the second device orientation, wherein in the second mapping orientation mode the processor-executable instructions stored in the second non-transitory processor-readable storage medium that, when executed by the second processor, cause the second processor to transmit the oriented input signal via the second communication interface, cause the second processor to transmit a second oriented input signal via the second communication interface.

In the wearable electronic system, the processor-executable instructions stored in the first non-transitory processor-readable storage medium of the first wearable electronic device that, when executed by the first processor, cause the first wearable electronic device to generate and display a user interface on the display of the first wearable electronic device, may cause the first processor to effect: a first function of the user interface displayed on the display of the first wearable electronic device in response to receiving the first oriented input signal via the first communication interface; or a second function of the user interface displayed on the display of the first wearable electronic device in response to receiving the second oriented input signal via the first communication interface.

In the wearable electronic system, the first non-transitory processor-readable storage medium of the first wearable electronic device stores processor-executable instructions that, when executed by the first processor, may cause the first wearable electronic device to: set the first mapping orientation mode when the second wearable electronic device has a first device orientation; set the second mapping orientation mode when the second wearable electronic device has a second device orientation; and dynamically change between the first mapping orientation mode and the second mapping orientation mode in response to the first wearable electronic device receiving the device orientation signal indicative of a change in the device orientation of the second wearable electronic device.

In the wearable electronic system, the first wearable electronic device may comprise a head mounted electronic display unit.

In the wearable electronic system, the head mounted electronic display unit may comprise a pair of glasses.

In the wearable electronic system, the second wearable electronic device may comprise an electronic ring.

In the wearable electronic system, the first device orientation may correspond to the electronic ring being worn on the user's left hand and the second device orientation may correspond to the electronic ring being worn on the user's right hand.

In the wearable electronic system, the electronic ring may include an annular structure with a hole therethrough, and the first device orientation may correspond to an index finger of the user extending through the hole in the annular structure of the electronic ring in a first direction; and the second device orientation may correspond to the index finger of the user extending through the hole in the annular structure of the electronic ring in a second direction, the second direction opposite the first direction.

In the wearable electronic system, the device orientation sensor may include at least one sensor selected from a group consisting of: an inertial sensor, an accelerometer, and a gyroscope.

In the wearable electronic system, the first communication interface of the first wearable electronic device may be a first wireless communication interface; the second communication interface of the second wearable electric device may be a second wireless communication interface; the first wireless communication interface may be wirelessly communicatively coupleable with the second wireless communication interface to provide wireless communications between the first wearable electronic device and the second wearable electronic device; and the first non-transitory processor-readable storage medium of the first wearable electronic device may store processor-executable instructions that, when executed by the first processor, cause the first wearable electronic device to wirelessly transmit, via the first wireless communication interface.

In the wearable electronic system, the input device of the second wearable electronic device may include at least one button.

A method of operating a wearable electronic system comprising a first wearable electronic device and a second wearable electronic device, wherein the second wearable electronic device is operable in at least two different device orientations may be summarized as: detecting, by a device orientation sensor of the second wearable electronic device, a device orientation of the second wearable electronic device; receiving, by an input device of the second wearable electronic device, an input from a user of the second wearable electronic device; wirelessly transmitting a signal by the second wearable electronic device, the signal based on at least one of the device orientation of the second wearable electronic device detected by the device orientation sensor and the input from the user of the second wearable electronic device received by the input device; wirelessly receiving the signal by the first wearable electronic device; displaying, by a display of the first wearable electronic device, a user interface to the user; in response to the device orientation sensor of the second wearable electronic device detecting that the device orientation of the second wearable electronic device corresponds to a first device orientation: effecting, by the wearable electronic system, a first mapping orientation mode; and effecting, by the first wearable electronic device, a first function of the user interface displayed to the user by the display of the first wearable electronic device in response to wirelessly receiving the signal by the first wearable electronic device; and, in response to the device orientation sensor of the second wearable electronic device detecting that the device orientation of the second wearable electronic device corresponds to a second device orientation: effecting, by the wearable electronic system, a second mapping orientation mode; and effecting, by the first wearable electronic device, a second function of the user interface displayed to the user by the display of the first wearable electronic device in response to wirelessly receiving the signal by the first wearable electronic device.

In the method, wirelessly transmitting a signal by the second wearable electronic device may include wirelessly transmitting, by the second wearable electronic device, both a device orientation signal from the device orientation sensor and an input signal from the input device, wirelessly receiving the signal by the first wearable electronic device may include wirelessly receiving both the device orientation signal and the input signal by the first wearable electronic device; in response to the device orientation sensor of the second wearable electronic device detecting that the device orientation of the second wearable electronic device corresponds to the first device orientation: effecting, by the wearable electronic system, a first mapping orientation mode in response to the device orientation sensor of the second wearable electronic device detecting that the device orientation of the second wearable electronic device corresponds to a first device orientation may include effecting, by a processor of the first wearable electronic device, the first mapping orientation mode in response to wirelessly receiving the device orientation signal by the first wearable electronic device; and effecting, by the first wearable electronic device, a first function of the user interface displayed to the user by the display of the first wearable electronic device in response to wirelessly receiving the signal by the first wearable electronic device may include effecting, by the processor of the first wearable electronic device, the first function of the user interface displayed to the user by the display of the first wearable electronic device in response to wirelessly receiving the input signal by the first wearable electronic device; and, in response to the device orientation sensor of the second wearable electronic device detecting that the device orientation of the second wearable electronic device corresponds to the second device orientation: effecting, by the wearable electronic system, a second mapping orientation mode in response to the device orientation sensor of the second wearable electronic device detecting that the device orientation of the second wearable electronic device corresponds to a second device orientation may include effecting, by the processor of the first wearable electronic device, the second mapping orientation mode in response to wirelessly receiving the device orientation signal by the first wearable electronic device; and effecting, by the first wearable electronic device, a second function of the user interface displayed to the user by the display of the first wearable electronic device in response to wirelessly receiving the signal by the first wearable electronic device may include effecting, by the processor of the first wearable electronic device, the second function of the user interface displayed to the user by the display of the first wearable electronic device in response to wirelessly receiving the input signal by the first wearable electronic device.

In the method, the method may also include generating, by the device orientation sensor of the second wearable electronic device, a device orientation signal in response to detecting, by the device orientation sensor, the device orientation of the second wearable electronic device; generating, by the input device of the second wearable electronic device, an input signal in response to receiving, by the input device, the input from the user of the second wearable electronic device; and processing, by a second processor of the second wearable electronic device that is communicatively coupled to both the device orientation sensor and the input device, the device orientation signal and the input signal to define an oriented input signal, wherein: in response to the device orientation sensor of the second wearable electronic device detecting that the device orientation of the second wearable electronic device corresponds to the first device orientation, effecting, by the wearable electronic system, the first mapping orientation mode includes defining, by the second processor of the second wearable electronic device, a first oriented input signal; and in response to the device orientation sensor of the second wearable electronic device detecting that the device orientation of the second wearable electronic device corresponds to the second device orientation, effecting, by the wearable electronic system, the second mapping orientation mode includes defining, by the second processor of the second wearable electronic device, a second oriented input signal.

In the method, wirelessly transmitting a signal by the second wearable electronic device may include wirelessly transmitting, by the second wearable electronic device, the oriented input signal; wirelessly receiving the signal by the first wearable electronic device may include wirelessly receiving the oriented input signal by the first wearable electronic device; in response to the device orientation sensor of the second wearable electronic device detecting that the device orientation of the second wearable electronic device corresponds to the first device orientation, effecting, by the first wearable electronic device, a first function of the user interface displayed to the user by the display of the first wearable electronic device in response to wirelessly receiving the signal by the first wearable electronic device may include effecting, by a first processor of the first wearable electronic device, the first function of the user interface displayed to the user by the display of the first wearable electronic device in response to wirelessly receiving the first oriented input signal by the first wearable electronic device; and in response to the device orientation sensor of the second wearable electronic device detecting that the device orientation of the second wearable electronic device corresponds to the second device orientation, effecting, by the first wearable electronic device, a second function of the user interface displayed to the user by the display of the first wearable electronic device in response to wirelessly receiving the signal by the first wearable electronic device may include effecting, by the first processor of the first wearable electronic device, the second function of the user interface displayed to the user by the display of the first wearable electronic device in response to wirelessly receiving the second oriented input signal by the first wearable electronic device.

In the method, the first wearable electronic device may include a head mounted electronic display unit, and wirelessly receiving the signal by the first wearable electronic device may include wirelessly receiving the signal by the head mounted electronic display unit; and displaying, by the display of the first wearable electronic device, a user interface to the user may include displaying, by a display of the head mounted electronic display unit, a user interface to the user.

In the method, the second wearable electronic device may include an electronic ring, and detecting, by the device orientation sensor of the second wearable electronic device, the device orientation of the second wearable electronic device may include detecting by the electronic ring the device the device orientation of the electronic ring; receiving, by the input device of the second wearable electronic device, the input from the user of the second wearable electronic device may include receiving, by the input device of the electronic ring, the input from the user of the electronic ring; and wirelessly transmitting the signal by the second wearable electronic device, the signal based on at least one of the device orientation of the second wearable electronic device detected by the device orientation sensor and the input from the user of the second wearable electronic device received by the input device may include wirelessly transmitting the signal by the electronic ring, the signal based on at least one of the device orientation of the electronic ring detected by the device orientation sensor and the input from the user of the electronic ring received by the input device.

In the method, the effecting, by the wearable electronic system, the first mapping orientation mode may include performing a first mapping, by the first processor, of a first user input received from the second wearable electronic device to a first function of the user interface displayed on the display of the first wearable electronic device, and effecting, by the wearable electronic system, the second mapping orientation mode may include performing a second mapping, by the first processor, of the first user input received from the second wearable electronic device to a second function of the user interface displayed on the display of the first wearable electronic device.

In the method, effecting, by the wearable electronic system, the second mapping orientation mode may include performing a first mapping, by the first processor, of the second user input received from the second wearable electronic device to the first function of the user interface displayed on the display of the first wearable electronic device.

In the method, the method may also include setting the first mapping orientation mode when the second wearable electronic device has a first device orientation; setting the second mapping orientation mode when the second wearable electronic device has a second device orientation; and dynamically changing between the first mapping orientation mode and the second mapping orientation mode in response to the first wearable electronic device receiving the signal indicative of a change in the device orientation of the second wearable electronic device.

In the method, the second wearable electronic device may include an electronic ring and detecting, by the device orientation sensor of the first wearable electronic device, a device orientation of the second wearable electronic device may include detecting, by the device orientation sensor of the first wearable electronic device, if the electronic ring is being worn on the user's left hand or if the electronic ring is being worn on the user's right hand.

In the method, the electronic ring may include an annular structure with a hole therethrough, and detecting, by the device orientation sensor of the first wearable electronic device, a device orientation of the second wearable electronic device may include detecting, by the device orientation sensor of the first wearable electronic device if an index finger of the user is extending through the hole in the annular structure of the electronic ring in a first direction or if the index finger of the user is extending through the hole in the annular structure of the electronic ring in a second direction, the second direction opposite the first direction.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIGS. 4A and 4B are perspective views of the second wearable electronic device of FIG. 3 having an input device showing the second wearable electronic device in a first orientation and in a second orientation, respectively.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

The headings and Abstract of the Disclosure provided herein are for convenience only and do not interpret the scope or meaning of the embodiments.

Herein, the term "carried by" should be understood to refer to physical coupling of two objects, the physical coupling including coupling on, within, along, flush with, in a recess, etc.

A user may have more than one wearable electronic device and it can be desirable to have wearable electronic devices of different sizes for comfort. When such wearable electronic devices are used and communicate with another electronic device, it can be desirable to have the communication hardware of the wearable electronic device be transferable between wearable electronic devices.

Figure 1:
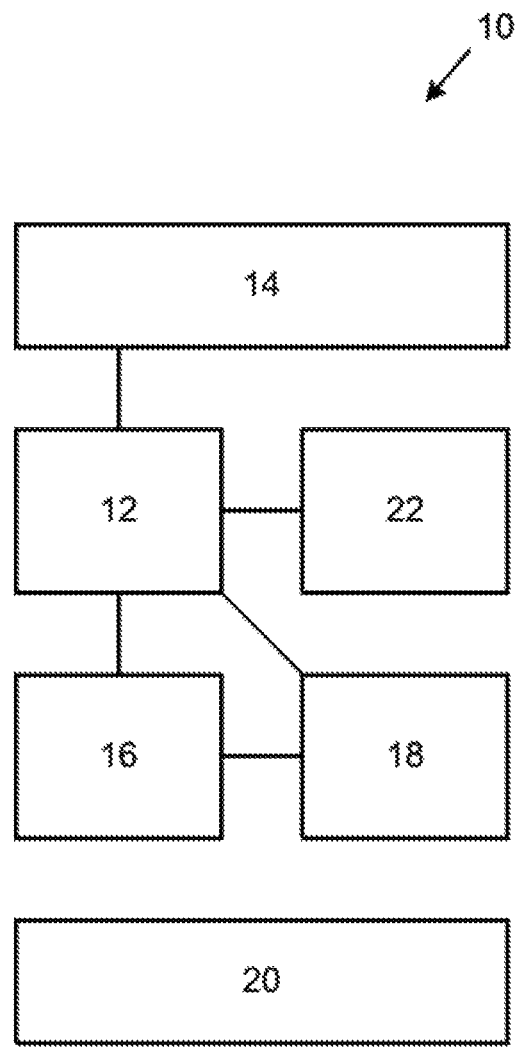
FIG. 1 is a block diagram illustrating a wearable electronic device, according to one embodiment.

Referring now to FIG. 1, shown therein is a block diagram illustrating a wearable electronic device 10 in accordance with one or more implementations. Device 10 includes one or more non-transitory computer- or processor-readable storage media 12, one or more processors 14, one or more communication interfaces 16 (e.g., one or more tethered connector ports, radios and associated antennas (not shown)), an input/output (I/O) subsystem 18, an optional power system 20, and one or more sensors 22.

The one or more non-transitory computer- or processor-readable storage media 12 optionally includes high-speed random access memory and optionally also includes non-volatile memory, such as one or more magnetic disk storage devices, flash memory devices, or other non-volatile solid-state memory devices. Access to storage medium 12 by other components of wearable electronic device 10, such as processors 14 is, optionally, controlled by a memory controller (not shown), for example via a bus or other communications channel. The one or more non-transitory computer- or processor-readable media 12 stores processor-executable instructions, and/or data, executable by the one or more processors 14, and which when executed cause the one or more processors 14 to perform the various methods described herein.

The one or more processors 14 run or execute various software programs and/or sets of instructions stored in the one or more non-transitory computer- or processor-readable media 12 to perform various functions for wearable electronic device 10 and to process data.

The one or more communication interfaces 16 receive and send signals (e.g., radio frequency RF or microwave frequency signals, also called electromagnetic signals). The one or more communication interfaces 16 convert electrical signals to/from electromagnetic signals and communicate with communications networks and other communications devices via the electromagnetic signals. The one or more communication interfaces 16 optionally include circuitry for performing such operations, including but not limited to a tethered connector port (e.g., USB, firewire, lightning connector, etc.), an antenna system, an RF transceiver, one or more amplifiers, a tuner, one or more oscillators, a digital signal processor, a CODEC chipset, a subscriber identity module (SIM) card, memory, and so forth. The one or more communication interfaces 16 optionally communicate with networks, such as the Internet, an intranet and/or a wireless network, such as a cellular telephone network, a wireless local area network (LAN) and/or a metropolitan area network (MAN), and other devices by wireless communication.

I/O subsystem 18 couples input/output peripherals of wearable electronic device 10, such input or control devices, with a peripherals interface (not shown). I/O subsystem 18 can include a controller for each of the input or devices.

Power system 20 generally provides electrical power to the various components of the wearable electronic device 10 (not all connections shown). Power system 20 optionally includes a power management system, one or more power sources (e.g., primary battery cells, secondary power cells, fuel cells, super- or ultra-capacitors), a recharging system, a power failure detection circuit, a power converter or inverter, a power status indicator (e.g., a light-emitting diode (LED)) and any other components associated with the generation, management and distribution of power in portable devices. The recharging system may receive wired power (from e.g. a micro-USB charger) or wireless power via receipt of electromagnetic waves by one or more inductors or inductive interfaces, and provide the electrical power to the one or more power sources via one or more wired or electrically conductive paths.

Wearable electronic device 10 also includes one or more sensors 22. Sensors can include accelerometers, gyroscopes, magnetometers (e.g., as part of an inertial measurement unit (IMU)), vibration, shock, impact, and any other appropriate inertial sensors (herein referred to as impact sensors) to obtain information representative of a position, orientation, change in position and, or change in orientation (e.g., attitude), acceleration, angular velocity, and/or vibration of the wearable electronic device 10. In some implementations, these sensors can be coupled with a peripherals interface (not shown).

It should be appreciated that wearable electronic device 10 is only one example of a wearable electronic device and that wearable electronic device 10 optionally has more or fewer components than shown, optionally combines two or more components, or optionally has a different configuration or arrangement of the components. The various components shown in FIG. 1 are implemented in hardware, software, firmware, or a combination thereof, including one or more signal processing and/or application specific integrated circuits.

Figure 2:
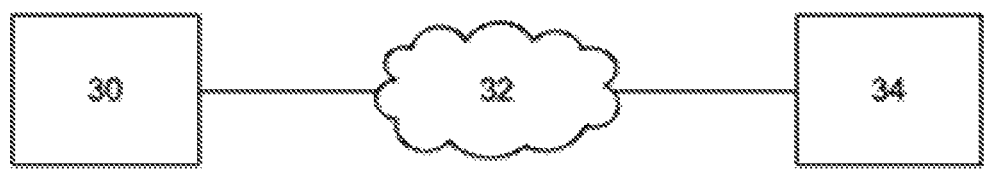
FIG. 2 is a block diagram illustrating a first wearable electronic device communicating with a second wearable electronic device, according to one embodiment.

FIG. 2 is a block diagram illustrating a first wearable electronic device 30 communicating with a second wearable electronic device 34, in accordance with one or more implementations described herein. Second wearable electronic device 34 may include a display screen displaying a user interface for viewing by the user of the first wearable electronic device 30.

First wearable electronic device 30 communicates with second wearable electronic device 34 via a communications channel, for instance a communication network 32, which may be a wired connection, a Wi-Fi network, WiMAX, Zigbee, Z-Wave, Bluetooth™, Bluetooth™ Low Energy, near-field communication, or any other type of connection capable of providing uni-directional or bi-directional communication between the second wearable electronic device 34 and the first wearable electronic device 30.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

Referring now to FIGS. 3A to 3F (collectively referred to as FIG. 3 herein), shown therein are right side, front, left side, right perspective, top, and left perspective views, respectively, of a wearable electronic system 100. The wearable electronic system 100 has a variable mapping orientation mode. The system 100 includes a first wearable electronic device 110 and a second wearable electronic device 120. According to at least one implementation, the first wearable electronic device 110 can be a head mounted electronic display unit 110 and the second wearable electronic device 120 can be an electronic ring 120, as shown in FIG. 3. Electronic ring 120 may include an annular structure with a hole therethrough, as shown, or may have any other shape with a hole therethrough for insertion of a user's finger. Optionally, the system 100 can also include a connecting case 130 for securing the first and second wearable electronic devices 110, 120. An example of a similar system is described in US Patent Application Publication 2017-0097753. In FIGS. 3A to 3F, the head mounted electronic display unit and the electronic ring are each shown positioned outside of an interior of the connecting case 130. It should be noted that the head mounted electronic display unit and the electronic ring are only one possible implementation of the first wearable electronic device 110 and the second wearable electronic device 120, respectively.

Figure 3A:
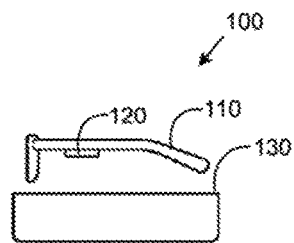
FIGS. 3A to 3F are right side, front, left side, right side perspective, top and left side perspective views of a first wearable electronic device and a second wearable electronic device, according to another embodiment.
Figure 3B:
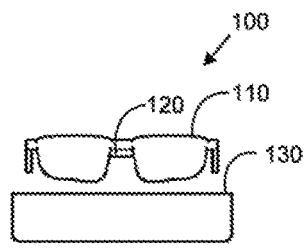
Figure 3C:
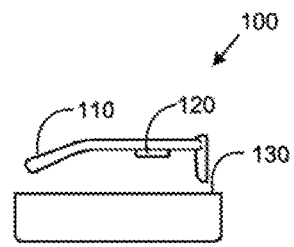
Figure 3D:
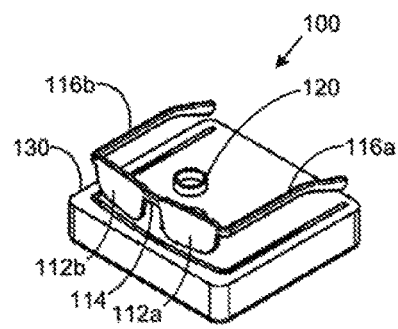

The head mounted electronic display unit 110 can be glasses, as shown in FIG. 3D. The glasses may include a frame holding a pair of lenses 112a and 112b (collectively referred to as 112 herein). The frame may include a bridge 114 between the lenses, as well as a right arm 116a and a left arm 116b (collectively referred to as 116 herein). The shape of the glasses is shown for illustrative purposes and is not limited to the illustrated shape. Other shapes can be used. Furthermore, other head mounted electronic display units 110 can be used. For example, a head mounted electronic display unit 110 may cover a portion of the user's head, such as a helmet, may rest on top of a user's head, and/or wrap around a user's head, such as a headband. A head mounted electronic display unit 110 may further include fastening or elastic members to secure to the user's head.

Electronic ring 120 can be worn around a finger of a user, for example a ring finger or an index finger on a hand of the user. The shape of the electronic ring 120 is shown for illustrative purposes and is not limited to the illustrated shape. Other shapes can be used. The electronic ring 120 can have any appropriate shape that allows the ring body to remain positioned around the finger of the user. For example, the electronic ring 120 can have a general shape of a circular band (open or closed), a helix, or a spiral. With a helix or spiral shape, the electronic ring 120 can have one or more turns. The electronic ring 120 can also have a break. With a break in the electronic ring 120, the electronic ring may expand to accommodate or tolerate fingers having different ring sizes. Some example systems and devices that may be included in the electronic ring 120 are described in U.S. Provisional Patent Application Ser. No. 62/607,819 and U.S. Provisional Patent Application Ser. No. 62/608,463.

Figure 3E:
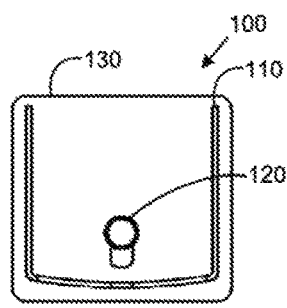
Figure 3F:
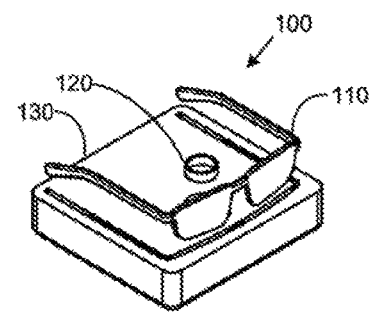

As shown in FIG. 3E, the connecting case 130 can have an interior or recesses and be shaped to receive the first wearable electronic device 110 and/or the second wearable electronic device 120. The shape of the connecting case 130 is shown for illustrative purposes and is not limited to the illustrated shape. As shown in FIG. 3, the connecting case 130 can receive both the first wearable electronic device 110 and the second wearable electronic device 120. That is, the connecting case 130 can receive the head mounted electronic display unit 110 and the electronic ring 120. In some implementations, the connecting case 130 can receive only one wearable electronic device. When the connecting case 130 receives only one wearable electronic device, the connecting case 130 can include a connection port to communicatively couple to a second wearable electronic device or a second connecting case that holds the second wearable electronic device.

FIGS. 4A and 4B illustrates another implementation of a second wearable electronic device of the wearable electronic system 100, shown as a second electronic ring 402. Second wearable electronic device 402 can also be worn on a finger of a user. FIG. 4A shows the second wearable electronic device 402 being worn on an index finger of left hand of the user and FIG. 4B shows the second wearable electronic device 402 being worn on an index finger of a right hand of the user.

Second wearable electronic device 402 includes a device orientation sensor (not shown in FIGS. 4A and 4B; similar to sensor 22 shown in FIG. 1) for detecting an orientation of the second wearable electronic device 402. The device orientation sensor may include an accelerometer, gyroscope, magnetometer (e.g. as part of an inertial measurement unit (IMU)), vibration, shock, impact, and any other appropriate inertial sensors (herein referred to as impact sensors) for obtaining information concerning the position (e.g., attitude), acceleration, orientation, angular velocity, and/or vibration of the second wearable electronic device 402.

In some implementations, the device orientation sensor may be an accelerometer that is enabled to detect a position and/or orientation of second wearable electronic device 402 relative to the ground. For instance, the device orientation sensor may detect the position and/or orientation of the second wearable electronic device 402 relative to the ground based on an asymmetry in the shape of the second wearable electronic device 402. For instance, second wearable electronic device 402 may include a first side 404 and a second side 406. When second wearable electronic device 402 is worn on a finger of a user's right hand, second side 406 of the second wearable electronic device 402 may tend to be closer to the ground than first side 404 when the second wearable electronic device 402 is used (e.g. when a user is activating input device 410). Correspondingly, when the second wearable electronic device 402 is worn on a finger of a user's left hand, the first side 404 may be closer to the ground than second side 406 when the wearable electronic device is used. The device orientation sensor may be able to determine which side of the first side 404 and the second side 406 of the second wearable electronic device 402 is closer to the ground and may therefore determine which hand of the user the second wearable electronic device 402 is worn.

In other implementations, the device orientation sensor may use pattern detection to detect a position and/or orientation of second wearable electronic device 402. For example, a user's left hand and right hand may have differing swing patterns while the user is walking and the device orientation sensor may be able to assess each swing pattern and determine when the wearable electronic device is being worn on the user's left hand and on the user's right hand.

The skilled person will understand that there are other mechanisms of which device orientation sensor may detect a position and/or orientation of second wearable electronic device 402 and therefore an orientation change of the second wearable electronic device 402 when the orientation device is moved between being worn on a finger of the user's left hand and on a finger of the user's right hand.

In some implementations, the second wearable electronic device 402 may include a processor (not shown). The processor of the second wearable electronic device 402 may poll the device orientation sensor over a period of time to assess an orientation of the second wearable electronic device 402 and to determine if a change in orientation has occurred.

In some implementations, the device orientation sensor of the second wearable electronic device 402 generates a device orientation signal. The device orientation sensor may generate a device orientation signal in response to a change of orientation of the second wearable electronic device 402. For instance, the device orientation signal may be generated in response to the device orientation sensor detecting that the second wearable electronic device 402 has been moved from an index finger of a user's right hand to an index finger of a user's left hand. In another example, the device orientation sensor may detect that the second wearable electronic device 402 has been moved from having the user's index finger passing through the wearable electronic device in a first direction to having the user's index finger passing through the wearable electronic device in a second direction, the second direction being opposed to the first direction. The device orientation signal may also be generated by a processor of the second wearable electronic device 402.

A communication interface (e.g. communication interface 16) of second wearable electronic device 402 can transmit the device orientation signal to a communication interface of the first wearable electronic device 110, such as but not limited to a head mounted electronic display unit 110. In some embodiments, the device orientation signal is transmitted by the second wearable electronic device 402 in response to the device orientation sensor detecting that the second wearable electronic device 402 has undergone a change of orientation.

Second wearable electronic device 402 includes at least one input device 410. Input device 410 is coupleable to the first processor of the second wearable electronic device 402. Input device 410 can generate an input signal that can be transmitted form the communication interface of the second wearable device 402 to the communication interface of the first wearable device 110. Inputs of input device 410 correspond to functions of a user interface displayed on a display of the first wearable electronic device 110.

The wearable electronic system 100 has a first mapping orientation mode that performs a first mapping between inputs from a user detected by input device 410 of the second wearable electronic device 402 and functions of a user interface displayed on the display of the first wearable electronic device 110 when the device orientation of the second wearable electronic device 402 detected by the device orientation sensor is a first device orientation, and a second mapping orientation mode that performs a second mapping between inputs from the user detected by the input device 410 of the second wearable electronic device 402 and functions of the user interface displayed on the display of the first wearable electronic device when the device orientation of the second wearable electronic device detected by the device orientation sensor is a second device orientation.

For example, as shown in FIGS. 4A and 4B, input device 410 may include buttons 410a and 410b. In the first mapping orientation mode, when the wearable electronic device is worn on the user's left hand, buttons 410a and 410b may be mapped to "up" and "down" movements, respectively. In the second mapping orientation mode, when the wearable electronic device is worn on the user's right hand, buttons 410a and 410b may be mapped to "down" and "up" movements, respectively.

In some implementations, an input device manager as, for example, a subsystem of I/O subsystem 18 of the wearable electronic device 10 (e.g. head mounted electronic display unit 110), may be used to store the first mapping orientation mode and the second mapping orientation mode. I/O subsystem 18 may be a software module that provides an interface between application programs and input devices, such as input device 410. In some implementations, I/O subsystem 18 (or an input device manager as a subsystem of I/O subsystem 18) may control the change between the first and a second mapping orientation modes in response to the wearable electronic device 10 (e.g. head mounted electronic display unit 110) receiving a device orientation signal (e.g. from the wearable electronic device 402).

In other implementations, the wearable electronic device 402 may include an I/O subsystem (or an input device manager as a subsystem of I/O subsystem). In these implementations, the I/O subsystem (or an input device manager as a subsystem of I/O subsystem) may control the change between a first and a second mapping orientation mode in response to the wearable electronic device 402 (e.g. head mounted electronic display unit 110) detecting the device orientation.

I/O subsystem 18 may set a first mapping orientation mode when the wearable electronic device 402 has a first device orientation and set the second mapping orientation mode when the wearable electronic device 402 has a second device orientation.

Although the examples described herein describe first and second mapping orientation modes, the skilled person will understand that additional mapping orientation modes are possible and can be activated in response to a detection of the orientation of the wearable electronic device 402.

The skilled person will understand that input device 410 may include various other input devices, such as but not limited to a button or buttons, a joystick, a capacitive touch sensor, a lever, a dial, a microphone, or motion sensors as user input devices and that the first and second mapping orientation modes may be customized to provide for use of the input devices on the user's left and right hands.

The mapping orientation mode of system 100 may be changed between the first mapping orientation mode and the second mapping orientation mode. In some implementations, the mapping orientation mode of system 100 may be changed in response to an orientation change of the second wearable electronic device 402.

In some implementations, other mechanisms may be used to indicate a change of orientation of the electronic ring 402. For example, a change of orientation of the electronic ring 402 may be manually entered into the electronic ring 402 by the user (e.g. using input device 410 of the electronic ring). In another example, a change of orientation of the electronic ring 402 may be manually entered into head mounted electronic display unit 110 by the user (e.g. using an input device of the head mounted electronic display unit 110).

In some implementations, the communication interface of the second wearable electronic device 402 transmits the device orientation signal and the input signal together as a signal. In these implementations, the processor of the first wearable electronic device can effect the first mapping orientation mode in response to receiving a first device orientation signal from the second wearable electronic device 402 that indicates that the second wearable electronic device 402 has a first device orientation. The processor of the first wearable electronic device can also, or alternatively, effect a second mapping orientation mode in response to receiving a second device orientation signal from the second wearable electronic device 402 indicative of the second wearable electronic device 402 having the second device orientation.

In some implementations, the second wearable electronic device 402 may include a processor and a non-transitory processor-readable storage medium that is communicatively coupled to the second processor. In these implementations, the second non-transitory processor-readable storage medium may store processor executable instructions that, when executed by the processor of the second wearable electronic device 402, cause the second wearable electronic device 402 to process the device orientation signal and the input signal to produce an oriented input signal and transmit the oriented input signal via the second communication interface.

In these implementations, processor-executable instructions stored in the second non-transitory processor-readable storage medium that, when executed by the processor of the second wearable electronic device, cause the processor of the second wearable electronic device to process the device orientation signal and the input signal to produce an oriented input signal, cause the processor of the second wearable electronic device to effect the first mapping orientation mode in response to receiving a first device orientation signal from the device orientation sensor of the second wearable electronic device indicative of the second wearable electronic device having the first device orientation. In the first mapping orientation mode the processor-executable instructions stored in the second non-transitory processor-readable storage medium that, when executed by the second processor, cause the second processor to transmit the oriented input signal via the second communication interface, cause the second processor to transmit a first oriented input signal via the second communication interface. The second mapping orientation mode, in response to receiving a second device orientation signal from the device orientation sensor indicative of the second wearable electronic device having the second device orientation. In the second mapping orientation mode the processor-executable instructions stored in the second non-transitory processor-readable storage medium that, when executed by the second processor, cause the second processor to transmit the oriented input signal via the second communication interface, cause the second processor to transmit a second oriented input signal via the second communication interface.

Figure 5:
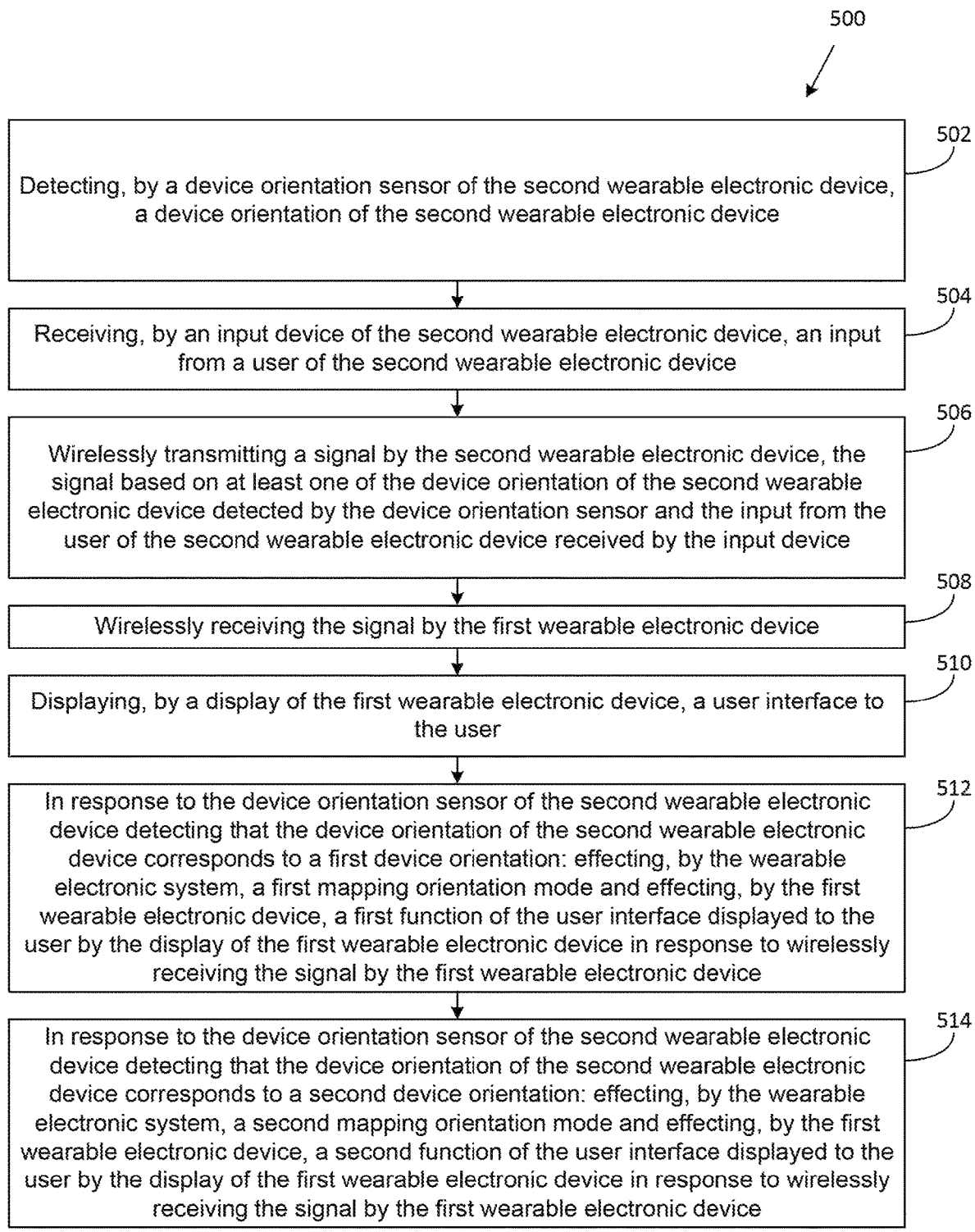
FIG. 5 is a flow-diagram of a method of controlling a mapping orientation of a first wearable electronic device, according to one embodiment.

Referring now to FIG. 5, shown therein is a flow-diagram of a method 500 of operating the wearable electronic system 100 including the first wearable electronic device 110 and the second wearable electronic device 402. In this method 500, the second wearable electronic device 402 is operable in at least two different device orientations. While method 500 is described with the first wearable electronic device as a head mounted electronic display unit and the second wearable electronic device as an electronic ring, those of skill in the art will understand that the first wearable electronic device and the second wearable electronic device can be any wearable electronic devices, provided that the first wearable electronic device has a processor and the second wearable electronic device has an input device. Method 500 includes four acts 502, 504, 506 and 508 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

Act 502 includes detecting, by a device orientation sensor of the second wearable electronic device 402, a device orientation of the second wearable electronic device.

Act 504 includes receiving, by an input device 410 of the second wearable electronic device 402, an input from a user of the second wearable electronic device.

Act 506 includes wirelessly transmitting a signal by the second wearable electronic device 402, the signal based on at least one of the device orientation of the second wearable electronic device 402 detected by the device orientation sensor and the input from the user of the second wearable electronic device 402 received by the input device 410. The device orientation signal can be generated in response to a change of orientation of the first wearable electronic device. In some implementations, a change of orientation of the second wearable electronic device 402 may be detected by the device orientation sensor of the second wearable electronic device 402. In other implementations, the change of orientation may be manually input by the user of the first wearable electronic device.

Act 508 includes wirelessly receiving the signal by the first wearable electronic device 110.

Act 510 includes displaying, by a display of the first wearable electronic device 110, a user interface to the user.

Act 512 includes, in response to the device orientation sensor of the second wearable electronic device 402, detecting that the device orientation of the second wearable electronic device 402 corresponds to a first device orientation: effecting, by the wearable electronic system 100, a first mapping orientation mode; and effecting, by the first wearable electronic device 110, a first function of the user interface displayed to the user by the display of the first wearable electronic device 110 in response to wirelessly receiving the signal by the first wearable electronic device 110.

Act 514 includes, in response to the device orientation sensor of the second wearable electronic device 402 detecting that the device orientation of the second wearable electronic device 402 corresponds to a second device orientation: effecting, by the wearable electronic system 100, a second mapping orientation mode; and effecting, by the first wearable electronic device 110, a second function of the user interface displayed to the user by the display of the first wearable electronic device 110 in response to wirelessly receiving the signal by the first wearable electronic device 110.

In some implementations, wirelessly transmitting the signal by the second wearable electronic device 402 includes wirelessly transmitting, by the second wearable electronic device 402, both a device orientation signal from the device orientation sensor and an input signal from the input device.

In some implementations, wirelessly receiving the signal by the first wearable electronic device 110 includes wirelessly receiving both the device orientation signal and the input signal by the first wearable electronic device 110.

In some implementations, the method 500 may also include generating, by the device orientation sensor of the second wearable electronic device 402, a device orientation signal in response to detecting, by the device orientation sensor, the device orientation of the second wearable electronic device 402.

In some implementations, the method 500 may also include generating, by the input device of the second wearable electronic device 402, an input signal in response to receiving, by the input device 410, the input from the user of the second wearable electronic device 402.

In some implementations, the method 500 may also include processing, by a processor of the second wearable electronic device 402 that is communicatively coupled to both the device orientation sensor and the input device, the device orientation signal and the input signal to define an oriented input signal. In these implementations, in response to the device orientation sensor of the second wearable electronic device 402 detecting that the device orientation of the second wearable electronic device 402 corresponds to the first device orientation, effecting, by the wearable electronic system 100, the first mapping orientation mode may include defining, by the processor of the second wearable electronic device 402, a first oriented input signal. In these implementations, in response to the device orientation sensor of the second wearable electronic device 402 detecting that the device orientation of the second wearable electronic device 402 corresponds to the second device orientation, effecting, by the wearable electronic system 100, the second mapping orientation mode may include defining, by the processor of the second wearable electronic device 402, a second oriented input signal.

In some implementations, wirelessly transmitting a signal by the second wearable electronic device 402 includes wirelessly transmitting, by the second wearable electronic device 402, the oriented input signal.

In some implementations, wirelessly receiving the signal by the first wearable electronic device 110 includes wirelessly receiving the oriented input signal by the first wearable electronic device 110.

In some implementations, in response to the device orientation sensor of the second wearable electronic device 402 detecting that the device orientation of the second wearable electronic device 402 corresponds to the first device orientation, effecting, by the first wearable electronic device 402, a first function of the user interface displayed to the user by the display of the first wearable electronic device 110 in response to wirelessly receiving the signal by the first wearable electronic device 110 includes effecting, by a first processor of the first wearable electronic device 110, the first function of the user interface displayed to the user by the display of the first wearable electronic device 110 in response to wirelessly receiving the first oriented input signal by the first wearable electronic device.

In some implementations, in response to the device orientation sensor of the second wearable electronic device 402 detecting that the device orientation of the second wearable electronic device 402 corresponds to the second device orientation, effecting, by the first wearable electronic device 110, a second function of the user interface displayed to the user by the display of the first wearable electronic device 110 in response to wirelessly receiving the signal by the first wearable electronic device 110 includes effecting, by the first processor of the first wearable electronic device 110, the second function of the user interface displayed to the user by the display of the first wearable electronic device 110 in response to wirelessly receiving the second oriented input signal by the first wearable electronic device 110.

In some implementations, the method 500 includes setting the first mapping orientation mode when the second wearable electronic device 402 has a first device orientation, setting the second mapping orientation mode when the second wearable electronic device 402 has a second device orientation; and dynamically changing between the first mapping orientation mode and the second mapping orientation mode in response to the first wearable electronic device 110 receiving a signal indicative of a change in the device orientation of the second wearable electronic device 402.

In some implementations, detecting, by the device orientation sensor of the first wearable electronic device 110, a device orientation of the second wearable electronic device includes detecting, by the device orientation sensor of the first wearable electronic device 110, if the electronic ring 402 is being worn on the user's left hand or if the electronic ring 402 is being worn on the user's right hand.

In some implementations, detecting, by the device orientation sensor of the first wearable electronic device 110, a device orientation of the second wearable electronic device 402 includes detecting, by the device orientation sensor of the first wearable electronic device 110 if an index finger of the user is extending through the hole in the annular structure of the electronic ring 402 in a first direction or if the index finger of the user is extending through the hole in the annular structure of the electronic ring 402 in a second direction, the second direction opposite the first direction.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable electronic system comprising:
a first wearable electronic device having a first processor, a first non-transitory processor-readable storage medium communicatively coupled to the first processor, a display communicatively coupled to the first processor, and a first communication interface communicatively coupled to the first processor; and
a second wearable electronic device having a first side, a second side, a device orientation sensor, a second communication interface communicatively coupled to the device orientation sensor, and an input device communicatively coupled to the second communication interface, the device orientation sensor to detect a device orientation of the second wearable electronic device based on whether the first side is below or above the second side when the input device receives an input and generate a device orientation signal in response to detecting the device orientation of the second wearable electronic device, the input device to receive the input from a user of the second wearable electronic device and generate an input signal in response to receiving the input from the user, and the second communication interface to transmit signals;
wherein:
the first communication interface is communicatively coupleable with the second communication interface to provide communications between the first wearable electronic device and the second wearable electronic device;
the first non-transitory processor-readable storage medium of the first wearable electronic device stores processor-executable instructions that, when executed by the first processor, cause the first wearable electronic device to generate and display a user interface on the display of the first wearable electronic device; and
the wearable electronic system has:
a first mapping orientation mode that performs a first mapping between inputs from the user detected by the input device of the second wearable electronic device and functions of the user interface displayed on the display of the first wearable electronic device when the device orientation of the second wearable electronic device detected by the device orientation sensor is a first device orientation based on the first side being below the second side when the input device receives the input; and a second mapping orientation mode that performs a second mapping between inputs from the user detected by the input device of the second wearable electronic device and functions of the user interface displayed on the display of the first wearable electronic device when the device orientation of the second wearable electronic device detected by the device orientation sensor is a second device orientation based on the first side being above the second side when the input device receives the input.

2. The system of claim 1 wherein the second communication interface of the second wearable electronic device is to transmit the device orientation signal and the input signal, and wherein the processor-executable instructions stored in the first non-transitory processor-readable storage medium of the first wearable electronic device that, when executed by the first processor, cause the first wearable electronic device to generate and display a user interface on the display of the first wearable electronic device, further cause the first processor to effect:

the first mapping orientation mode in response to receiving a first device orientation signal from the second wearable electronic device indicative of the second wearable electronic device having the first device orientation; or the second mapping orientation mode in response to receiving a second device orientation signal from the second wearable electronic device indicative of the second wearable electronic device having the second device orientation.

3. The system of claim 2 wherein:

in the first mapping orientation mode, the processor-executable instructions stored in the first non-transitory processor-readable storage medium of the first wearable electronic device that, when executed by the first processor, cause the first wearable electronic device to generate and display a user interface on the display of the first wearable electronic device, cause the first processor to effect a first function of the user interface displayed on the display of the first wearable electronic device in response to receiving the input signal via the first communication interface;

and in the second mapping orientation mode, the processor-executable instructions stored in the first non-transitory processor-readable storage medium of the first wearable electronic device that, when executed by the first processor, cause the first wearable electronic device to generate and display a user interface on the display of the first wearable electronic device, cause the first processor to effect a second function of the user interface displayed on the display of the first wearable electronic device in response to receiving the input signal via the first communication interface.

4. The system of claim 1 wherein in the first mapping orientation mode the first processor maps a first user input received from the second wearable electronic device to a first function of the user interface displayed on the display of the first wearable electronic device, and in the second mapping orientation mode the first processor maps the first user input received from the second wearable electronic device to a second function of the user interface displayed on the display of the first wearable electronic device.

5. The system of claim 4 wherein in the second mapping orientation mode the first processor maps a second user input received from the second wearable electronic device to the first function of the user interface displayed on the display of the first wearable electronic device.

6. The system of claim 1 wherein the second wearable electronic device further comprises a second processor and a second non-transitory processor-readable storage medium communicatively coupled to the second processor, the second non-transitory processor-readable storage medium storing processor executable instructions that, when executed by the second processor, cause the second wearable electronic device to:

process the device orientation signal and the input signal to produce an oriented input signal; and transmit the oriented input signal via the second communication interface.

7. The system of claim 6 wherein processor-executable instructions stored in the second non-transitory processor-readable storage medium that, when executed by the second processor, cause the second processor to process the device orientation signal and the input signal to produce an oriented input signal, cause the second processor to effect:

the first mapping orientation mode in response to receiving a first device orientation signal from the device orientation sensor indicative of the second wearable electronic device having the first device orientation, wherein in the first mapping orientation mode the processor-executable instructions stored in the second non-transitory processor-readable storage medium that, when executed by the second processor, cause the second processor to transmit the oriented input signal via the second communication interface, cause the second processor to transmit a first oriented input signal via the second communication interface; or the second mapping orientation mode in response to receiving a second device orientation signal from the device orientation sensor indicative of the second wearable electronic device having the second device orientation, wherein in the second mapping orientation mode the processor-executable instructions stored in the second non-transitory processor-readable storage medium that, when executed by the second processor, cause the second processor to transmit the oriented input signal via the second communication interface, cause the second processor to transmit a second oriented input signal via the second communication interface.

8. The system of claim 7 wherein the processor-executable instructions stored in the first non-transitory processor-readable storage medium of the first wearable electronic device that, when executed by the first processor, cause the first wearable electronic device to generate and display a user interface on the display of the first wearable electronic device, cause the first processor to effect:

a first function of the user interface displayed on the display of the first wearable electronic device in response to receiving the first oriented input signal via the first communication interface; or a second function of the user interface displayed on the display of the first wearable electronic device in response to receiving the second oriented input signal via the first communication interface.

9. The system of claim 1 wherein the first non-transitory processor-readable storage medium of the first wearable electronic device stores processor-executable instructions that, when executed by the first processor, cause the first wearable electronic device to:

set the first mapping orientation mode when the second wearable electronic device has the first device orientation;

set the second mapping orientation mode when the second wearable electronic device has the second device orientation; and dynamically change between the first mapping orientation mode and the second mapping orientation mode in response to the first wearable electronic device receiving the device orientation signal indicative of a change in the device orientation of the second wearable electronic device.

10. The system of claim 1 wherein the first wearable electronic device comprises a head mounted electronic display unit.

11. The system of claim 1 wherein the second wearable electronic device comprises an electronic ring, and wherein the first device orientation corresponds to the first side being below the second side indicating that the electronic ring is being worn on the user's left hand and the second device orientation corresponds to the first side being above the second side indicating that the electronic ring is being worn on the user's right hand.

12. The system of claim 1 wherein the second wearable electronic device comprises an electronic ring including an annular structure with a hole therethrough, and wherein:

the first device orientation corresponds to a finger of the user extending through the hole in the annular structure of the electronic ring in a first direction with the first side below the second side; and the second device orientation corresponds to the finger of the user extending through the hole in the annular structure of the electronic ring in a second direction with the first side above the second side, the second direction opposite the first direction.

13. A method of operating a wearable electronic system comprising a first wearable electronic device and a second wearable electronic device, wherein the second wearable electronic device is operable in at least two different device orientations, the method comprising:

receiving, by an input device of the second wearable electronic device, an input from a user of the second wearable electronic device;

detecting, by a device orientation sensor of the second wearable electronic device, a device orientation of the second wearable electronic device based on whether a first side of the second wearable electronic device is above or below a second side of the second wearable electronic device when the input device receives the input;

wirelessly transmitting a signal by the second wearable electronic device, the signal based on at least one of the device orientation of the second wearable electronic device detected by the device orientation sensor and the input from the user of the second wearable electronic device received by the input device;

wirelessly receiving the signal by the first wearable electronic device; displaying, by a display of the first wearable electronic device, a user interface to the user;

in response to the device orientation sensor of the second wearable electronic device detecting that the device orientation of the second wearable electronic device corresponds to a first device orientation based on the first side being below the second side when the input device receives the input:

effecting, by the wearable electronic system, a first mapping orientation mode; and effecting, by the first wearable electronic device, a first function of the user interface displayed to the user by the display of the first wearable electronic device in response to wirelessly receiving the signal by the first wearable electronic device; and in response to the device orientation sensor of the second wearable electronic device detecting that the device orientation of the second wearable electronic device corresponds to a second device orientation based on the first side being above the second side when the input device receives the input:

effecting, by the wearable electronic system, a second mapping orientation mode; and effecting, by the first wearable electronic device, a second function of the user interface displayed to the user by the display of the first wearable electronic device in response to wirelessly receiving the signal by the first wearable electronic device.

14. The method of claim 13 wherein: wirelessly transmitting a signal by the second wearable electronic device includes wirelessly transmitting, by the second wearable electronic device, both a device orientation signal from the device orientation sensor and an input signal from the input device;

wirelessly receiving the signal by the first wearable electronic device includes wirelessly receiving both the device orientation signal and the input signal by the first wearable electronic device;

in response to the device orientation sensor of the second wearable electronic device detecting that the device orientation of the second wearable electronic device corresponds to the first device orientation:

effecting, by the wearable electronic system, a first mapping orientation mode in response to the device orientation sensor of the second wearable electronic device detecting that the device orientation of the second wearable electronic device corresponds to a first device orientation includes effecting, by a processor of the first wearable electronic device, the first mapping orientation mode in response to wirelessly receiving the device orientation signal by the first wearable electronic device; and effecting, by the first wearable electronic device, a first function of the user interface displayed to the user by the display of the first wearable electronic device in response to wirelessly receiving the signal by the first wearable electronic device includes effecting, by the processor of the first wearable electronic device, the first function of the user interface displayed to the user by the display of the first wearable electronic device in response to wirelessly receiving the input signal by the first wearable electronic device; and in response to the device orientation sensor of the second wearable electronic device detecting that the device orientation of the second wearable electronic device corresponds to the second device orientation:

effecting, by the wearable electronic system, a second mapping orientation mode in response to the device orientation sensor of the second wearable electronic device detecting that the device orientation of the second wearable electronic device corresponds to a second device orientation includes effecting, by the processor of the first wearable electronic device, the second mapping orientation mode in response to wirelessly receiving the device orientation signal by the first wearable electronic device; and effecting, by the first wearable electronic device, a second function of the user interface displayed to the user by the display of the first wearable electronic device in response to wirelessly receiving the signal by the first wearable electronic device includes effecting, by the processor of the first wearable electronic device, the second function of the user interface displayed to the user by the display of the first wearable electronic device in response to wirelessly receiving the input signal by the first wearable electronic device.

15. The method of claim 13, further comprising:
generating, by the device orientation sensor of the second wearable electronic device, a device orientation signal in response to detecting, by the device orientation sensor, the device orientation of the second wearable electronic device;
generating, by the input device of the second wearable electronic device, an input signal in response to receiving, by the input device, the input from the user of the second wearable electronic device; and
processing, by a second processor of the second wearable electronic device that is communicatively coupled to both the device orientation sensor and the input device, the device orientation signal and the input signal to define an oriented input signal, wherein:
in response to the device orientation sensor of the second wearable electronic device detecting that the device orientation of the second wearable electronic device corresponds to the first device orientation, effecting, by the wearable electronic system, the first mapping orientation mode includes defining, by the second processor of the second wearable electronic device, a first oriented input signal; and
in response to the device orientation sensor of the second wearable electronic device detecting that the device orientation of the second wearable electronic device corresponds to the second device orientation, effecting, by the wearable electronic system, the second mapping orientation mode includes defining, by the second processor of the second wearable electronic device, a second oriented input signal.

16. The method of claim 15 wherein:
wirelessly transmitting a signal by the second wearable electronic device includes wirelessly transmitting, by the second wearable electronic device, the oriented input signal;
wirelessly receiving the signal by the first wearable electronic device includes wirelessly receiving the oriented input signal by the first wearable electronic device;
in response to the device orientation sensor of the second wearable electronic device detecting that the device orientation of the second wearable electronic device corresponds to the first device orientation, effecting, by the first wearable electronic device, a first function of the user interface displayed to the user by the display of the first wearable electronic device in response to wirelessly receiving the signal by the first wearable electronic device includes effecting, by a first processor of the first wearable electronic device, the first function of the user interface displayed to the user by the display of the first wearable electronic device in response to wirelessly receiving the first oriented input signal by the first wearable electronic device; and
in response to the device orientation sensor of the second wearable electronic device detecting that the device orientation of the second wearable electronic device corresponds to the second device orientation, effecting, by the first wearable electronic device, a second function of the user interface displayed to the user by the display of the first wearable electronic device in response to wirelessly receiving the signal by the first wearable electronic device includes effecting, by the first processor of the first wearable electronic device, the second function of the user interface displayed to the user by the display of the first wearable electronic device in response to wirelessly receiving the second oriented input signal by the first wearable electronic device.

17. The method of claim 16 wherein the effecting, by the wearable electronic system, the first mapping orientation mode includes performing a first mapping, by the first processor, of a first user input received from the second wearable electronic device to a first function of the user interface displayed on the display of the first wearable electronic device, and effecting, by the wearable electronic system, the second mapping orientation mode includes performing a second mapping, by the first processor, of the first user input received from the second wearable electronic device to a second function of the user interface displayed on the display of the first wearable electronic device.

18. The method of claim 13, further comprising:
setting the first mapping orientation mode when the second wearable electronic device has a first device orientation;
setting the second mapping orientation mode when the second wearable electronic device has a second device orientation; and
dynamically changing between the first mapping orientation mode and the second mapping orientation mode in response to the first wearable electronic device receiving the signal indicative of a change in the device orientation of the second wearable electronic device.

19. The method of claim 13 wherein the second wearable electronic device comprises an electronic ring and
detecting, the electronic ring is being worn on the user's left hand based on the first side being below the second side or detecting the electronic ring is being worn on the user's right hand based on the first side being above the second side.

20. The method of claim 13 wherein the second wearable electronic device comprises an electronic ring including an annular structure with a hole therethrough, and wherein:
detecting, the first device orientation based on a finger of the user is extending through the hole in the annular structure of the electronic ring in a first direction with the first side below the second side or idetecting the second device orientation based on the finger of the user is extending through the hole in the annular structure of the electronic ring in a second direction with the first side above the second side, the second direction opposite the first direction.

* * * * *

UNITED STATES PATENT AND TRADEMARK OFFICE
CERTIFICATE OF CORRECTION

| | | |
|---|---|---|
| PATENT NO. | : 11,580,849 B2 | Page 1 of 1 |
| APPLICATION NO. | : 16/596035 | |
| DATED | : February 14, 2023 | |
| INVENTOR(S) | : Jason T. Griffin et al. | |

It is certified that error appears in the above-identified patent and that said Letters Patent is hereby corrected as shown below:

In the Claims

At Column 26 Line 56, in Claim 20, please correct "idetecting" to be --detecting--

Signed and Sealed this
Twenty-first Day of November, 2023

Katherine Kelly Vidal
*Director of the United States Patent and Trademark Office*